United States Patent
Fennessy

(10) Patent No.: US 10,323,887 B2
(45) Date of Patent: Jun. 18, 2019

(54) HEAT EXCHANGER AND FABRICATION

(71) Applicant: Hamilton Sundstrand Corporation, Charlotte, NC (US)

(72) Inventor: Colette O. Fennessy, Bloomfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 30 days.

(21) Appl. No.: 15/671,903

(22) Filed: Aug. 8, 2017

(65) Prior Publication Data
US 2017/0336155 A1 Nov. 23, 2017

Related U.S. Application Data

(62) Division of application No. 14/823,555, filed on Aug. 11, 2015, now Pat. No. 9,746,257.

(51) Int. Cl.
| | |
|---|---|
| *B23P 15/00* | (2006.01) |
| *F28F 13/18* | (2006.01) |
| *B23P 15/26* | (2006.01) |
| *B22F 5/10* | (2006.01) |
| *F28F 7/02* | (2006.01) |

(Continued)

(52) U.S. Cl.
CPC ............ *F28F 13/18* (2013.01); *B22F 3/1055* (2013.01); *B22F 3/11* (2013.01); *B22F 5/10* (2013.01); *B23P 15/26* (2013.01); *B33Y 10/00* (2014.12); *B33Y 80/00* (2014.12); *F28F 7/02* (2013.01); *F28F 9/00* (2013.01); *F28F 21/08* (2013.01); *B22F 2999/00* (2013.01); *F28F 2200/00* (2013.01); *Y02P 10/295* (2015.11)

(58) Field of Classification Search
CPC .... F28F 13/18; F28F 9/00; F28F 21/08; F28F 7/02; F28F 2200/00; B23P 15/26; B22F 5/10; B33Y 80/00
See application file for complete search history.

(56) References Cited

U.S. PATENT DOCUMENTS

| | | |
|---|---|---|
| 4,442,886 A | 4/1984 | Dinulescu |
| 7,810,552 B2 | 10/2010 | Slaughter |

(Continued)

FOREIGN PATENT DOCUMENTS

| | | |
|---|---|---|
| EP | 2811249 A1 | 12/2014 |
| EP | 2865981 A1 | 4/2015 |

OTHER PUBLICATIONS

Search Report regarding related GB Application No. GB1613727.5; dated Jan. 11, 2017; 4 pgs.

*Primary Examiner* — Richard Chang
(74) *Attorney, Agent, or Firm* — Cantor Colburn LLP

(57) ABSTRACT

A heat exchanger and method for making a heat exchanger assembly is described, involving generating a digital model of a heat exchanger assembly that comprises a heat exchanger core within a housing. The digital model is inputted into an additive manufacturing apparatus or system comprising an energy source. The additive manufacturing apparatus applies energy from the energy source to successively applied incremental quantities of a metal powder, which fuses the powder to form incremental portions of the heat exchanger core and housing according to the digital model. Unfused or partially fused metal powder is enclosed in a first region of the heat exchanger assembly between the heat exchanger core and the housing.

8 Claims, 2 Drawing Sheets

(51) Int. Cl.
*F28F 9/00* (2006.01)
*F28F 21/08* (2006.01)
*B33Y 80/00* (2015.01)
*B22F 3/105* (2006.01)
*B22F 3/11* (2006.01)
*B33Y 10/00* (2015.01)

(56) References Cited

U.S. PATENT DOCUMENTS

| | | |
|---|---|---|
| 7,866,372 B2 | 1/2011 | Slaughter |
| 2014/0284038 A1 | 9/2014 | Vedula et al. |
| 2015/0114611 A1* | 4/2015 | Morris ................ F02C 7/10 165/166 |
| 2017/0045313 A1 | 2/2017 | Fennessy |

\* cited by examiner

HEAT EXCHANGER AND FABRICATION

CROSS-REFERENCE TO RELATED APPLICATION

This is a Divisional Application of U.S. application Ser. No. 14/823,555, filed on Aug. 11, 2015, the disclosure of which is incorporated herein by reference in its entirety.

BACKGROUND

This disclosure relates to a heat exchanger, and specifically to methods of manufacturing a heat exchanger in a housing.

Heat exchangers are devices built for transferring heat from one fluid to another. Heat is typically transferred without mixing of the fluids, which can be separated by a solid wall or other divider. Heat exchangers can be used in various applications, including but not limited to aerospace, refrigeration, air conditioning, space heating, electricity generation, and chemical processing applications.

A fluid on a heat rejection side of a heat exchanger typically undergoes a drop in temperature between the heat rejection side inlet and the heat rejection side outlet. Similarly, a fluid on a heat absorption side of a heat exchanger typically undergoes an increase in temperature between the heat absorption side inlet and the heat absorption side outlet. Such temperature variations can subject heat exchanger components to thermally-induced stress. Such thermal stresses can be managed by incorporating robust structures in the heat exchanger itself or in external mounting components that are resistant to or tolerant of thermal stress, or that can transfer stress to non-critical stress-absorbing structures. However, such robust structures add complexity and expense to product designs, as well as requiring extra weight that is not desirable in weight-sensitive applications such as aerospace or automotive applications.

BRIEF DESCRIPTION

According to some aspects of this disclosure, a method for making a heat exchanger assembly comprises generating a digital model of a heat exchanger assembly that comprises a heat exchanger core within a housing. The digital model is inputted into an additive manufacturing apparatus or system comprising an energy source. The additive manufacturing apparatus applies energy from the energy source to successively applied incremental quantities of a metal powder, which fuses the powder to form incremental portions of the heat exchanger core and housing according to the digital model. Unfused or partially fused metal powder is enclosed in a first region of the heat exchanger assembly between the heat exchanger core and the housing.

According to some aspects of the disclosure, the above-described method further includes selective exposure of incremental quantities of metal powder in a layer of a powder bed over a support with a laser or electron beam to fuse the selectively exposed metal powder in a pattern over the support corresponding to a layer of the digital model of the heat exchanger assembly. This process is repeated by providing a layer of the powder over the selectively exposed layer and selectively exposing incremental quantities of metal powder in the layer to fuse the selectively exposed powder in a pattern corresponding to another layer of the digital model of the article. Metal powder is removed from fluid flow paths of the heat exchanger core without removing metal powder from the first region of the assembly between the heat exchanger core and the housing.

In some aspects of the disclosure, a heat exchanger assembly comprises a housing, a heat exchanger core within the housing, and unfused or partially fused metal powder in a first region of the heat exchanger assembly between the heat exchanger core and the housing.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
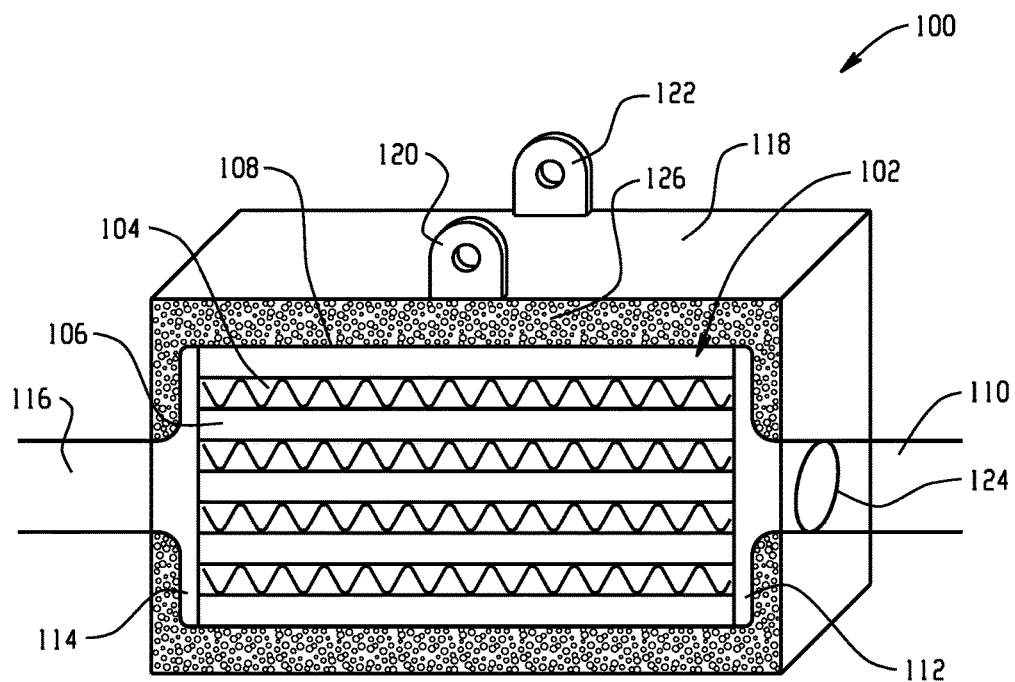
FIG. 1 is a schematic depiction of a heat exchanger assembly.

Referring now to the Figures, FIG. 1 depicts an example of a heat exchanger assembly 100. The assembly 100 is shown in an isometric view with a cross-section along the front face to illustrate the inside of the assembly. As shown in FIG. 1, a plate-fin heater core 102 has heat absorption side flow paths 104, and heat rejection side flow paths 106 contained in a heater core skin 108. A hot fluid (e.g., air) enters the heat rejection side flow paths 106 through hot fluid inlet 110 and inlet header 112, and exits through outlet header 114 and outlet 116. It should be noted that although FIG. 1 depicts a single pass heat rejection side flow path, that two-pass, multi-pass, or counter flow paths can also be used. A cold fluid (e.g., air) is fed through the heat absorption side flow paths 104 in a direction transverse to the flow through the heat rejection side flow paths 106. The heater core 102 is housed within a housing 118, which can be have features such as mounting brackets 120, 122, and opening 124 for the hot fluid inlet 110 (an opening in the housing 118 for outlet 116 is not shown). The region of the assembly between the heater core 102 and the housing 118 is filled with unfused or partially fused metal powder 126.

Figure 2:
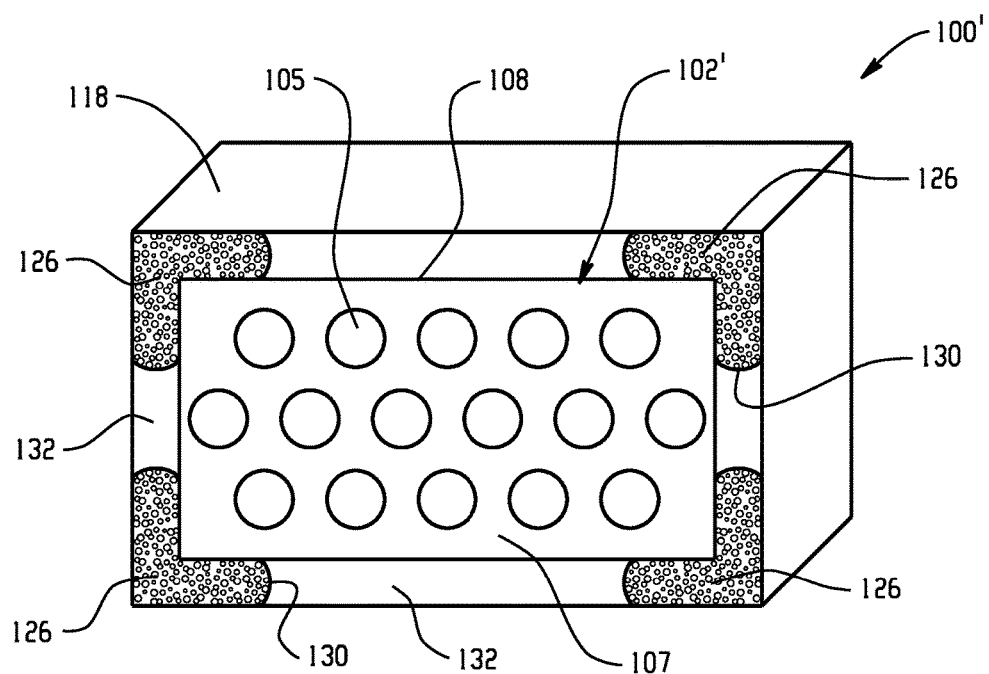
FIG. 2 is a schematic depiction of a heat exchanger assembly.

Of course, FIG. 1 is a specific example of a broader disclosure, and variations can be made by the skilled person. For example, FIG. 1 depicts an embodiment where the entirety of the space between the heater core 102 and the housing 118 is filled with unfused or partially fused metal powder 126, but smaller regions can be used as shown in FIG. 2. FIG. 2 depicts a heat exchanger assembly 100' where the same numbering of identical features with FIG. 1 is carried forward. As shown in FIG. 2, heat exchanger core 102' is disposed within housing 118. Heater core 102' is depicted as a tube-shell heat exchanger core with the tubes 105 providing flow paths for one side of the heat exchanger (either heat rejection or heat absorption), and the space 107 outside the tubes 105 and inside of the heater core shell 108 providing flow paths for the opposite side of the heat exchanger (either heat rejection or heat absorption). For ease of illustration, inlets and outlets to both fluid flow path sides of the heat exchanger core through the housing 118 are not shown. Compared to FIG. 1 where the entirety of the space between the heater core 102 and the housing 118 is filled with unfused or partially fused metal powder 126, FIG. 2 depicts an embodiment where the unfused or partially fused metal powder 126 is contained in regions around the corners of the heater core 102', which are separated by enclosure barriers 130 from regions 132. In some examples of embodiments regions 132 can be free of metal powder, and in some examples of embodiments regions 132 can contain unfused or partially fused metal powder at a different density than the metal powder in the corner regions. Also, other configurations for the heater core, the housing, and the regions between the housing can be used by the skilled person. For example, unfused or partially fused metal powder could be disposed in the regions 132 while the corner regions are free of metal powder. Other types of heat exchanger cores (e.g., honeycomb) can also be used, as well as variations on the shape and configuration of the heat exchanger cores and housings.

Figure 3:
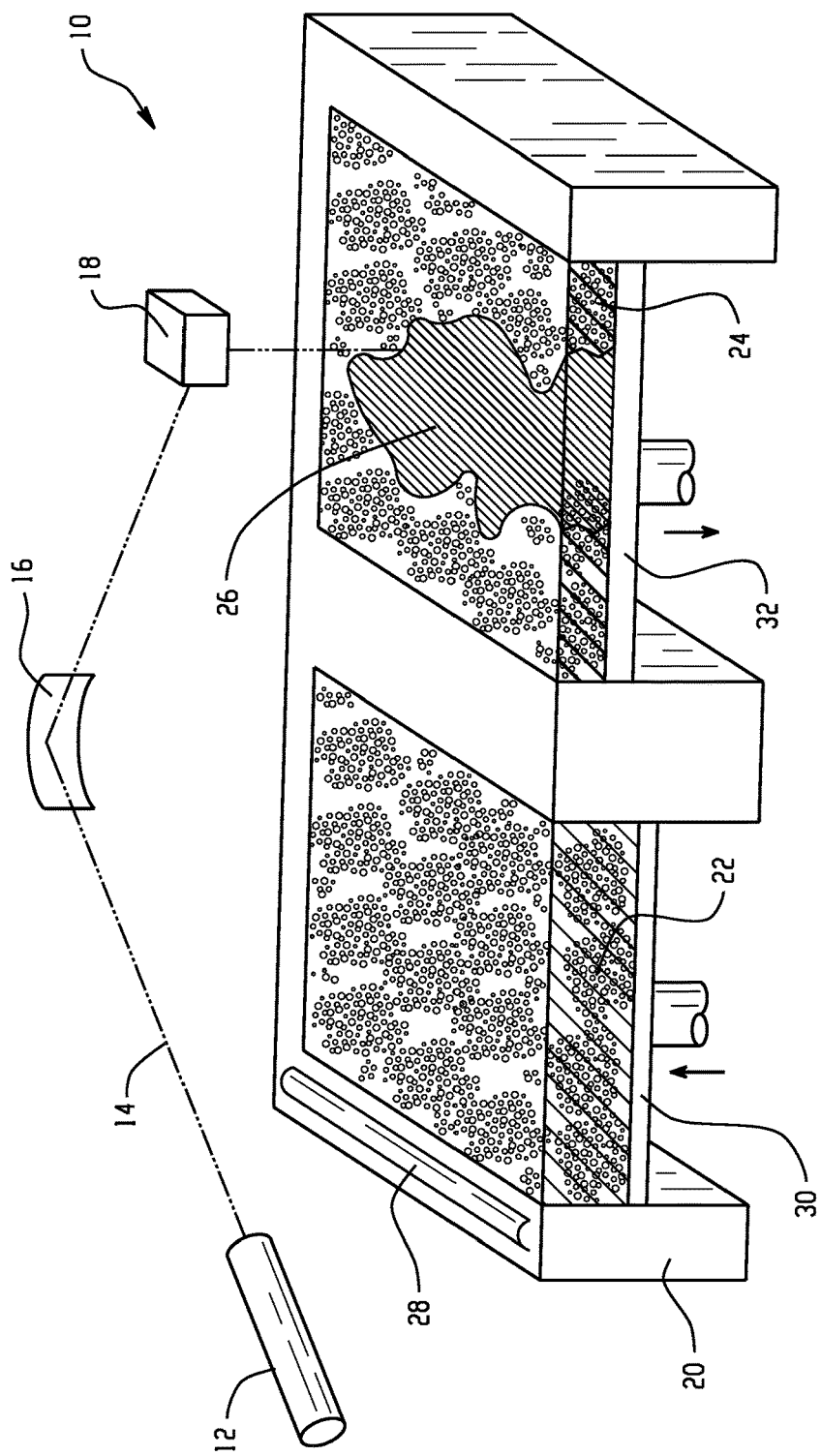
FIG. 3 is a schematic depiction of an apparatus for making heat exchanger assemblies described herein.

The above-described heat exchanger assemblies can be made using an additive manufacturing process. Referring now to FIG. 3, an example of an additive manufacturing system or apparatus 10 includes energy source 12 that generates an energy beam 14, a first wave guide or other optical guide 16 that is used to guide the energy beam, a second wave guide or optical guide 18, a frame 20, a powder supply 22, a powder processing bed 24, sintered powder material 26, a spreader 28, a powder supply support 30, and a stack support 32. Of course, the illustration in the Figure is schematic in nature, and many alternative designs of additive manufacturing devices are possible. Various types of additive manufacturing materials, energy sources, powder feed and storage, atmosphere control, and processes can be used to fabricate the heat exchanger and the individual features thereof that are described herein. The type of additive manufacturing process used depends in part on the type of material out of which it is desired to manufacture the component. In some embodiments, the heat exchanger is made of metal, and a metal-forming additive manufacturing process can be used. Such processes can include selective laser sintering (SLS), powder bed laser fusion (PBLF), or direct metal laser sintering (DMLS), in which a layer of metal or metal alloy powder is applied to the workpiece being fabricated and selectively sintered according to the digital model with heat energy from a directed laser beam. Another type of metal-forming process includes selective laser melting (SLM) or electron beam melting (EBM), in which heat energy provided by a directed laser or electron beam is used to selectively melt (instead of sinter) the metal powder so that it fuses as it cools and solidifies. FIG. 3 merely illustrates one potential additive manufacturing system for creating an additively manufactured article.

Energy source 12 can be any source capable of creating focused energy. For example, energy source 12 can be a laser or an electron beam generator. Energy source 12 generates an energy beam 14, which is a beam of focused or focusable energy, such as a laser beam or an electron beam. Optical guide 16 such as a mirror is present in some embodiments to deflect radiation in a desired direction. A second optical guide 18, such as an optical head is present in some embodiments, and also directs energy in a desired direction. For example, optical guide 18 can include a mirror and be attached to an x-y positioning device. Frame 20 is used to contain powder material in powder supply 22 and in powder processing bed 24. Powder supply 22 and powder processing bed 24 include powder material, such as or powdered metals. Powder processing bed 24 further includes fused powder 26. Fused powder 26 is powder contained within powder processing bed 24 that has been at least partially sintered or melted. Spreader 28 is a spreading device such as an air knife using an inert gas instead of air, which can transfer powder material from powder supply 22 to powder processing bed 24. The depiction of spreader 28 in FIG. 3 is of course only schematic in nature, and does not depict specific features such as controllably directed air jet nozzles that could be used to remove metal powder from targeted portions of the assembly such as fluid flow passages in the heat exchanger core, without removing metal powder from the first region between the heat exchanger core and the housing. Powder supply support 30 and stack support 32 are used to raise and/or lower material thereon during additive manufacturing.

During operation, energy source 12 generates energy beam 14, which is directed by the optical guides 16 and 18 to the powder processing bed 24. The energy intensity and scanning rate and pattern of the energy beam 14 can be controlled to produce a desired result in the powder processing bed. In some aspects, the result can be partial melting of powder particles resulting in a fused structure after solidification such as a sintered powder metal structure having some degree of porosity derived from the gap spaces between fused powder particles. In some aspects, the result from exposure to the energy beam 14 can be complete localized melting and fluidization of the powder particles producing a metal article having a density approaching or equal to that of a cast metal article. In some aspects, the energy beam provides homogeneous melting such that an examination of the manufactured articles can detect no particle pattern from the original particles. After each layer of the additively manufactured article is completed, powder supply support 30 is moved to raise the height of powder material supply 22 with respect to frame. Similarly, stack support 32 is moved to lower the height of article with respect to frame 20. Spreader 28 transfers a layer of powder from powder supply 22 to powder processing bed 24. By repeating the process several times, an object may be constructed layer by layer. Components manufactured in this manner may be made as a single, solid component, and are generally stronger if they contain a smaller percentage of oxygen, hydrogen, or carbonaceous gases. In some embodiments, the quantity of impurities of, for example, oxygen, is reduced to less than 50 ppm, or even less than 20 ppm.

As mentioned above, a region between a heat exchanger core and a housing comprises unfused or partially fused metal powder. This powder around the core can allow thermal expansion of the core with reduced susceptibility to damage or failure. Unfused metal powder is metal powder that has not been fused with the additive manufacturing energy source. Partially fused metal powder is metal powder where particles have been fused together, but have not reached a state where the particles have melted and coalesced to form a solid metal of maximum density. Fully fused metal powder is metal powder where particles have fully fused together reaching its maximum density. Unfused metal can have an apparent density equal to about 50% of the wrought material density. Fully fused metal powder is metal powder that has reached its maximum density, typically at least 99.9% of wrought material with a porosity level of less than 0.1%. Partially fused metal powder can have a density between that of unfused metal powder and fully fused metal powder. In some examples of embodiments, the metal powder in the first region between the heat exchanger core and housing is unfused. In some examples of embodiments, the metal powder in the first region between the heat exchanger core and housing is partially fused. The structural components of the heat exchanger core and housing can be formed by fusing metal powder to form a solid metal of maximum density or sintering to form a solid metal having residual porosity from the particulate structure (e.g., having a density range between 99.2% and 99.9% of maximum density).

As mentioned above, unfused or partially fused metal powder is enclosed in a region between a heat exchanger core and housing. In the case of partially fused metal powder, the partial fusion of the powder will typically keep the metal powder in this region in place while fabrication of the assembly is completed and metal powder removed from open spaces such as heat exchanger core fluid flow paths or empty regions 132 (FIG. 2). In the case of unfused metal powder to be enclosed in this region, metal powder outside of the enclosure region must be removed without removing powder from the enclosure region. Depending on the design and configuration of the heat exchanger assembly, powder removal can be accomplished after completion of the structures enclosing the unfused metal powder (e.g., by blowing a fluid such as air through the fluid flow paths after completion of assembly) In cases where an enclosed region free of powder is called for or where powder removal after completion of the unfused powder enclosure structure is not feasible, powder can be selectively removed during the manufacturing process (without removing unfused powder from powder-containing region) using controllable air nozzles.

The digital models used in the practice of the disclosure are well-known in the art, and do not require further detailed description here. The digital model can be generated from various types of computer aided design (CAD) software, and various formats are known, including but not limited to SLT (standard tessellation language) files, AMF (additive manufacturing format) files, PLY files, wavefront (.obj) files, and others that can be open source or proprietary file formats.

As mentioned above, the powder used in the methods described herein comprises a metal powder. Various metals can be used, depending on the material and properties requirements for the application of the finished product. Various ferrous steel alloys can be used, including stainless and non-stainless steels, with optional inclusion of various alloying elements such as chromium or nickel for properties such as high-temperature performance. Other alloys such as aluminum alloys and titanium can be used as well. Metal powders can be formed using a gas atomized process. Examples of particle sizes for the metal powders can range from 5 μm to 150 μm. In some aspects, the alloy elements can be combined together before forming a powder having a homogeneous composition. In some aspects, one or more of the individual alloy elements can have its own powder particles that are mixed with particles of other elements in the alloy mixture, with formation of the actual alloy to occur during the fusion step of the additive manufacturing process. In some aspects, the powder is "neat", i.e., it includes only particles of the alloy or alloy elements. In other aspects, the powder can include other components such as polymer powder particles. In selective sintering, polymer particles can help to temporarily bind metal powder particles together during processing, to be later removed by pyrolysis caused by the energy source or post-fabrication thermal processing.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A heat exchanger assembly, comprising
a housing of the heat exchanger assembly;
a heat exchanger core within the housing; and
unfused or partially fused metal powder enclosed in a first region of the heat exchanger assembly between the heat exchanger core and the housing.

2. The heat exchanger assembly of claim 1, wherein the first region comprises unfused metal powder.

3. The heat exchanger assembly of claim 1, wherein the first region comprises partially fused metal powder.

4. The heat exchanger assembly of claim 1, wherein the first region encases the heat exchanger core.

5. The heat exchanger assembly of claim 1, further comprising a second region between the heat exchanger core and the housing that is free of metal powder.

6. The heat exchanger assembly of claim 1, wherein the assembly further comprises a second region between the heat exchanger core and the housing that comprises partially fused metal powder at a different density than the metal powder in the first region.

7. The heat exchanger assembly of claim 1, further comprising an enclosure separating the first region from one or more other regions between the heat exchanger core and the housing.

8. The heat exchanger assembly of claim 1, wherein the heat exchanger core comprises a heat rejection side flow path and a heat absorption side flow path in a heater core skin.

* * * * *